US012115604B2

(12) United States Patent
Knoener et al.

(10) Patent No.: US 12,115,604 B2
(45) Date of Patent: Oct. 15, 2024

(54) SYSTEMS AND METHODS FOR VOLTAGE CONTROL OF A SHORT CIRCUIT DURING A PULSE WELDING PROCESS

(71) Applicant: Illinois Tool Works Inc., Glenview, IL (US)

(72) Inventors: Craig Steven Knoener, Appleton, WI (US); Lucas Charles Johnson, Appleton, WI (US); Zach W. MacMullen, Larsen, WI (US); Charles Ace Tyler, Neenah, WI (US); Christine Dong, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 869 days.

(21) Appl. No.: 16/653,555

(22) Filed: Oct. 15, 2019

(65) Prior Publication Data

US 2020/0122262 A1 Apr. 23, 2020

Related U.S. Application Data

(60) Provisional application No. 62/748,140, filed on Oct. 19, 2018.

(51) Int. Cl.
*B23K 9/09* (2006.01)
*B23K 9/095* (2006.01)
*B23K 9/10* (2006.01)

(52) U.S. Cl.
CPC ............ *B23K 9/092* (2013.01); *B23K 9/0953* (2013.01); *B23K 9/10* (2013.01); *B23K 9/1062* (2013.01)

(58) Field of Classification Search
CPC .......... B23K 9/09; B23K 9/092; B23K 9/093; B23K 9/095; B23K 9/0953; B23K 9/0956; B23K 9/10; B23K 9/1062; B23K 9/062
See application file for complete search history.

(56) References Cited

U.S. PATENT DOCUMENTS

| 6,087,627 A * | 7/2000 | Kramer | ................. | B23K 9/095 |
| | | | | 219/130.21 |
| 6,376,802 B1 * | 4/2002 | Tong | ..................... | B23K 9/091 |
| | | | | 219/130.21 |

(Continued)

FOREIGN PATENT DOCUMENTS

| CN | 104334305 | 2/2015 |
| JP | S59179268 | 10/1984 |

(Continued)

*Primary Examiner* — Brian W Jennison
(74) *Attorney, Agent, or Firm* — MCANDREWS HELD & MALLOY LTD.

(57) ABSTRACT

Systems and methods for clearing a short during a GMAW-P welding process are disclosed. A welding-type power supply may include a power conversion circuitry configured to convert input power to welding-type power, and a controller configured to control the power conversion circuitry based on a plurality of operating parameters. In examples, if the controller senses an occurrence of a short circuit during the welding cycle (e.g., during the background state), the voltage-controlled process can adjust an output current to increase in order to achieve one or more short state target voltage values. Once the short has cleared (as evidenced by a spike in voltage) and/or a desired short state target voltage value is achieved, the controller can again adjust the output current to decrease until the voltage has returned to a background voltage level.

21 Claims, 4 Drawing Sheets

(56) References Cited

U.S. PATENT DOCUMENTS

| | | | |
|---|---|---|---|
| 7,067,767 B2* | 6/2006 | Hsu | B23K 9/092 219/130.21 |
| 9,393,635 B2* | 7/2016 | Peters | B23K 9/09 |
| 9,415,457 B2* | 8/2016 | Daniel | B23K 9/093 |
| 9,442,481 B2* | 9/2016 | Davidson | B23K 9/0953 |
| 2002/0030043 A1* | 3/2002 | Tong | B23K 9/124 219/130.33 |
| 2003/0102845 A1* | 6/2003 | Aker | H02J 7/0048 320/140 |
| 2005/0184039 A1* | 8/2005 | Stava | B23K 9/093 219/130.33 |
| 2005/0211747 A1* | 9/2005 | Wang | B23K 9/092 228/101 |
| 2005/0284854 A1* | 12/2005 | Tong | B23K 9/125 219/130.51 |
| 2007/0164007 A1* | 7/2007 | Peters | B23K 9/0953 219/130.51 |
| 2007/0246448 A1* | 10/2007 | Nishisaka | B23K 9/092 219/130.51 |
| 2008/0156781 A1* | 7/2008 | Artelsmair | B23K 9/091 219/137.71 |
| 2009/0321401 A1* | 12/2009 | Peters | B23K 9/091 219/137 PS |
| 2010/0155383 A1* | 6/2010 | Shiozaki | B23K 9/09 219/130.51 |
| 2012/0097655 A1* | 4/2012 | Daniel | B23K 9/1043 219/130.21 |
| 2013/0112675 A1* | 5/2013 | Peters | B23K 9/092 219/130.51 |
| 2013/0112676 A1* | 5/2013 | Hutchison | B23K 9/09 219/130.51 |
| 2016/0221105 A1* | 8/2016 | Henry | B23K 9/173 |
| 2016/0361773 A1* | 12/2016 | Knoener | B23K 9/173 |
| 2016/0361777 A1* | 12/2016 | Knoener | B23K 9/1043 |
| 2018/0354075 A1* | 12/2018 | Liu | B23K 26/0673 |

FOREIGN PATENT DOCUMENTS

| | | |
|---|---|---|
| JP | S6178568 | 4/1986 |
| JP | 2004268095 | 9/2004 |
| JP | 2011073022 A * | 4/2011 |

* cited by examiner

SYSTEMS AND METHODS FOR VOLTAGE CONTROL OF A SHORT CIRCUIT DURING A PULSE WELDING PROCESS

RELATED APPLICATIONS

This patent claims priority to U.S. Provisional Patent Application Ser. No. 62/748,140, filed Oct. 19, 2018, entitled "Systems and Methods for Voltage Control of a Short Circuit During a Pulse Welding Process." The entirety of U.S. Provisional Patent Application Ser. No. 62/748,140 is incorporated herein by reference.

TECHNICAL FIELD

This disclosure relates generally to welding-type power supplies and, more particularly, to systems and methods for auto-tuning a pulsed gas metal arc welding (GMAW) process.

BACKGROUND

Welding-type components (e.g., welding torches) are sometimes powered by welding-type power supplies. Conventional power supplies use a range of electrical components and/or electrical circuitry to produce appropriate welding-type power for various welding-type operations and/or welding-type components.

One known welding process is a pulsed metal inert gas (MIG) process. A pulsed MIG process typically has a cyclical output having at least a peak portion with a relatively high current and a background portion with a relatively low current. There is often an abrupt change in slope from the beginning and end of the peak and background portions.

SUMMARY

The present disclosure is directed to systems and methods to control pulse welding, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
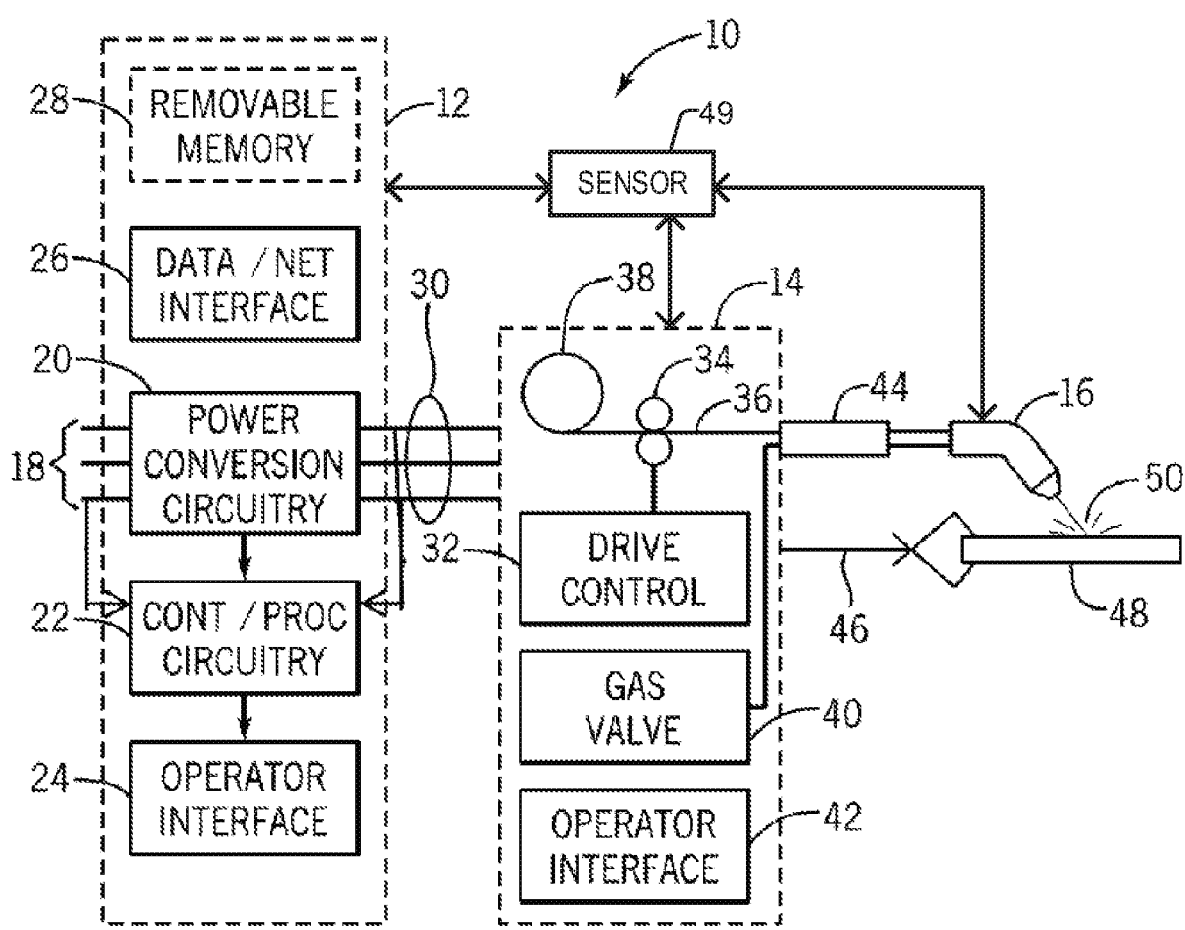
FIG. 1 is a diagram of an example welding-type system in accordance with aspects of this disclosure.

Pulse welding, as used herein, includes welding with output power that is generally pulsed, at a controllable frequency, between a greater peak and a lesser background, and pulse welding is performed in an arc state. Occasional, inadvertent shorts may occur, but the process is generally in an arc state. Welding cycle (or pulse cycle), as used herein, is comprised of multiple states of at least a peak current state, followed by a decreasing transitional state, followed by a background current state with a current value lower than the peak current, followed by an increasing transitional state. Welding cycles are typically on the order of milliseconds or tens of milliseconds. Welding cycles can include other portions as well, and a controller can use a state-based control scheme where, under certain circumstance, the typical order (peak, down, background, up) is modified.

As disclosed herein, controls for a pulsed GMAW (GMAW-P) process can be modified for significant improvements over conventional short circuit transfer processes. In some examples, the systems and methods disclosed herein employ voltage control short-clearing routine.

As disclosed herein, in the event a short is sensed by a controller, the controller can be configured to change the control scheme to a voltage-controlled process. For example, if the controller senses an occurrence of a short circuit during the welding cycle (e.g., during the background state), the voltage-controlled process can adjust an output current to increase in order to achieve one or more short state target voltage values. Once the short has cleared (as evidenced by a spike in voltage) and/or a desired short state target voltage value is achieved, the controller can again adjust the output current to decrease until the voltage has returned to a background voltage level. Having returned to the background voltage level, the controller can either remain in the voltage-controlled process or transition to a current-controlled process. The process then continues and the welding cycle repeats.

The controller can also be configured to use a separate short inductance target value. For example, the change to the current value is derived from the inductor differential equation relating voltage, current, and time, as monitored during the welding process, received and analyzed by the controller. Advantageously, use of the disclosed system and methods results in the improved GMAW short circuit transfer to clear shorts in GMAW-P With improvements to conventional pulsed GMAW weld current controls, the average voltage current and voltage can be reduced. Although advantageous in some respects, this leads to an increase in the number of shorts during a welding process. It may now be possible to intentionally incur a short after each pulse cycle. Thus, an improved GMAW short circuit transfer process configured to clear short circuits (both intentional and incidental) during a pulsed GMAW welding process is desirable.

Examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general-purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating. As used herein, a welding-type power supply refers to any device capable of, when power is applied thereto, supplying suitable power for welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example welding-type systems include: power conversion circuitry configured to convert input power to welding-type power; and control circuitry configured to control the power conversion circuitry to output the welding-type power in a plurality of pulse cycles, each pulse cycle comprising a background portion, a ramp up portion, a peak portion, and a ramp down portion. The controlling of the power conversion circuitry includes: monitoring one or more output power parameters of the welding-type power during the plurality of pulse cycles; determining a short state based on the one or more output power parameters; and controlling the power conversion circuitry in a voltage-controlled mode using a short state target voltage as a command voltage in response to the short state.

In some examples, the control circuitry is configured to change from a current-controlled mode to a voltage-controlled mode in response to the short state. In examples, the one or more output parameters comprises a voltage, a current, or a time value, the controller to: monitor a change in output voltage during adjustment of the command voltage; determine when the short state has cleared based on a rate of change in the output voltage; and control the power conversion circuitry using a short state target voltage as the command voltage in response to clearance of the short state.

In examples, the one or more output parameters comprises a voltage, a current, or a time value, the controller configured to: control the power conversion circuitry to decrease the current at a first rate following clearance of the short state until a trigger event occurs; and control the power conversion circuitry to decrease the current at a second rate in response to the occurrence of the trigger.

In some examples, the trigger corresponds to a threshold current value, the controller configured to: monitor the current during the ramp down portion; determine the trigger has occurred when the current reaches a threshold current value; and control the power conversion circuitry to decrease the current at the second rate in response to reaching the threshold current value.

In examples, the threshold current value corresponds to a back porch current value, the controller configured to control the power conversion circuitry to transition to a back porch state when the current reaches the back porch current value. In some examples, the controller is configured to calculate the back porch current value as a predetermined percentage of the peak current. In some examples, the predetermined percentage is 75% of the peak current.

In some examples, the controller is configured to control the power conversion circuitry to decrease the current at the second rate until a background current is reached. In examples, the trigger corresponds to a predetermined amount of time, the controller configured to control the power conversion circuitry to decrease the current at the second rate for the predetermined amount of time. In some examples, the ramp down portion comprises a dive state and a post dive state. In examples, the first rate corresponds to the dive state In some examples, the second rate corresponds to the post dive state.

In disclosed examples, the control circuitry is configured to control the power conversion circuitry in a current-controlled mode in response to clearance of the short state. In some examples, the control circuitry is configured to control the power conversion circuitry in the voltage-controlled mode by controlling the power conversion circuitry based on comparing an output voltage of the power conversion circuitry to the command voltage.

In examples, the controller is configured to derive the change in the current from an inductor parameter based on the following equation:

$$L = \frac{V}{d_i} d_t,$$

where L is the inductance parameter, V is a difference between the commanded output voltage and a representative output voltage value for one or more short circuit clearing events, $d_t$ is a representative control loop period, and $d_i$ is a representative current change for the control loop period.

Disclosed example methods for pulse welding involve: controlling, via control circuitry, power conversion circuitry to convert input power to output welding-type power in a plurality of pulse cycles, each pulse cycle comprising a background portion, a ramp up portion, a peak portion, and a ramp down portion. The controlling the power conversion circuitry includes: monitoring one or more output power parameters of the welding-type power during the plurality of pulse cycles; determining a short state based on the one or more output power parameters; changing from a current-controlled mode to a voltage-controlled mode in response to the short state; controlling the power conversion circuitry in a voltage-controlled mode using a short state target voltage as a command voltage in response to the short state.

In some examples, the method includes monitoring a change in the output voltage during adjustment of the command voltage; determining when the short state has cleared based on a rate of change in the output voltage; and controlling the power conversion circuitry using a background voltage as the command voltage in response to clearance of the short state.

In some examples, the one or more output parameters comprises a voltage, a current, or a time value, the method further comprising: controlling the power conversion circuitry to decrease the current at a first rate following clearance of the short state until a trigger occurs; and controlling the power conversion circuitry to decrease the current at a second rate in response to the occurrence of the trigger.

In some examples, the trigger corresponds to a threshold current value, the method further includes monitoring the current during the ramp down portion, determining the trigger has occurred when the current reaches a threshold current value; and controlling the power conversion circuitry to decrease the current at the second rate in response to reaching the threshold current value.

FIG. 1 is a diagram of an example welding-type system 10 in accordance with aspects of this disclosure. The example welding-type system 10 is a GMAW (gas metal arc welding) system, and in particular a MIG welding system. However, the example system 10 may perform flux cored arc welding (FCAW) and/or other wire-fed weld processes. In the example of FIG. 1, the system 10 includes a power supply 12 configured to receive and convert input power to welding-type power, which is output to a wire feeder 14. The wire feeder delivers the power to a welding torch 16 to perform a welding operation.

The power supply 12 receives input power 18 from any suitable source, such as the power grid, an engine-generator set, hybrid power supplies, fuel cells, batteries, and/or any combination of these input power sources and/or other power sources. Power conversion circuitry 20 converts the input power 18 to welding-type power. The power supply 12 may be designed to carry out multiple different welding processes that can be selected by an operator, and the power conversion circuitry 20 includes components, such as solid-state switches discussed below, that allow for power conversion in accordance with the desired process.

Control circuitry 22 is coupled to the power conversion circuitry 20 and controls the operation of the power conversion circuitry during the selected process. For example, the control circuitry 22 may provide signals that regulate the conductive states of solid state switches within the power conversion circuitry to produce the desired output power, as also discussed below. In many applications, the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. The processes and other welding parameters may be selected via an operator interface 24 that is coupled to the control circuitry 22.

The power supply 12 may further include communications circuitry that allows for communications with remote or networked components and systems, illustrated as data/network interface 26 in FIG. 1. Such communications circuitry may allow for monitoring of welding operations, logging of weld data, downloading or configuration of new processes and updates to processes, and so forth. Finally, the power supply 12 will sometimes include removable memory 28 that may be used for storing processes, process parameters, system updates, and any suitable data.

The example system 10 includes a wire feeder 14, which may be separate from and/or integrated into the power supply 12 (e.g., contained within a housing of the power supply 12). In the illustrated example, power and/or data may be transferred from the power supply 12 to the wire feeder 14 via one or more cables or cable bundles 30. The wire feeder 14 includes drive control circuitry 32 that regulates the operation of a drive assembly 34. Drive control 32 along with control circuitry 22 together are the controller for system 10. The controller may include other control modules as well. The drive assembly 34 contacts and feeds a wire electrode 36 to the welding operation. The wire electrode is typically stored on a spool 38 within the wire feeder. The wire feeder may also include one or more gas valves for providing shielding gas for a welding operation. Finally, an operator interface 42 may allow certain parameters of the wire feeder to be selected, such as wire feed speed. The power supply 12 and wire feeder 14 may operate in coordination so that wire and gas resources are fed to the welding operation when power is provided for welding at the initiative of the welding operator (e.g., via a control on the torch 16).

The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

The example power conversion circuitry 20 includes an input rectifier that converts AC power to DC power, a power factor correction boost circuit that receives the rectified input and provides a boosted bus to an isolated converter. The converter may be a dual two-switch interleaved forward converter, which may include an output rectifier and an output inductor. The wire feeder 14 feeds the wire at a rate set by the user, and the control circuitry 22 causes power circuit 18 to provide an output at the current necessary for that wire feed speed, and at the desired voltage.

One or more sensors 49 can be also be included. The sensor(s) 49 may be integrated with power supply 12, wire feeder 14, and/or welding torch 16, and/or be external and configured to communicate via one or more communications channels and/or interfaces. In some examples, the sensor(s) 49 are configured to measure welding parameters (e.g., voltage, current, temperature, etc.) and/or external parameters (e.g., workpiece and/or environmental temperature, etc.).

Figure 2A:
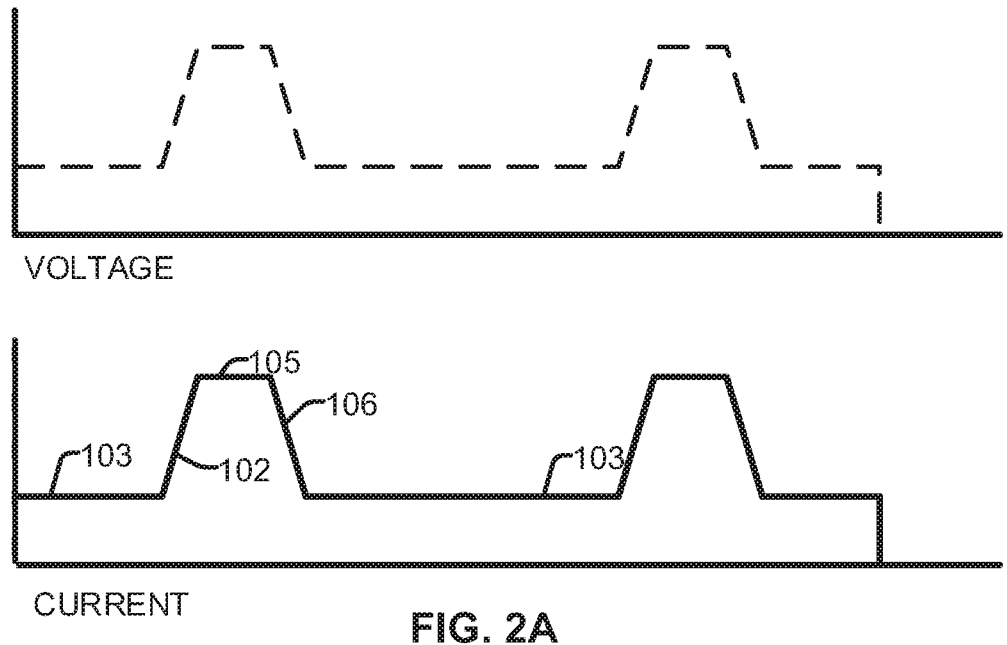
FIG. 2A shows current and voltage waveforms without a short state in accordance with aspects of this disclosure.
Figure 2B:
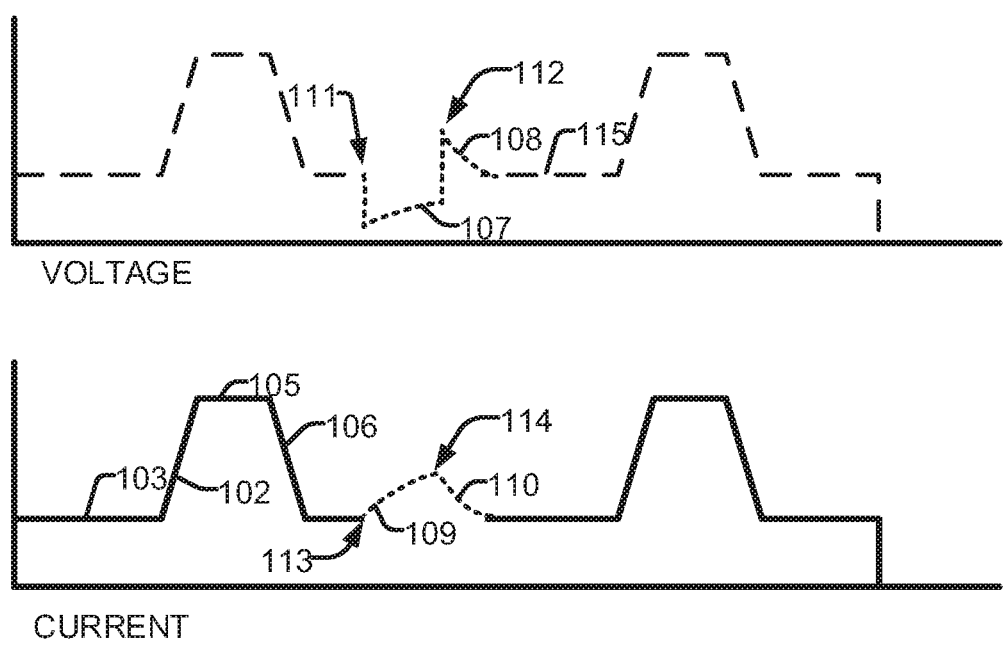
FIG. 2B shows a current and voltage waveforms experiencing a short state in a background state in accordance with aspects of this disclosure.

A periodic pulsed GMAW weld current waveform and weld voltage waveform are both shown in FIGS. 2A and 2B. In some examples, a controller (e.g., control circuitry 22) commands adjustments in the weld current during the welding process, which results in changes in the weld voltage. In the absence of a short, the weld voltage waveform, by and large, follows the shape of the weld current waveform shown in FIG. 2A.

As shown in FIGS. 2A and 2B, four weld states are provided with reference to voltage and current waveforms. As shown in the current waveform, a background state 103, a background-to-peak transitional state 102, a peak state 105, and a peak-to-background transitional state 106 are present during a pulsed welding cycle. During the peak state 105 and the background state 103, the controller may regulate either the weld current (e.g., as a constant current pulse) or the weld voltage to generate a desired power output. During the background-to-peak transitional state 102, the controller may increase the current from a current level ($I_{BG}$) associated with the background state 103 to a current level ($I_{PEAK}$) associated with the peak state 105. For example, the increase may be by a pre-defined ramp rate, expressed in units of amperes per millisecond (A/ms). During the peak-to-background transitional state 106, the controller may decrease the current from IPEAK to IBG at a defined ramp rate, commonly in units of A/ms.

Conventional pulsed GMAW programs were designed to operate at elevated temperatures. Due to the increased heat, the weld controllers struggled with maintaining stability during the welding process, and resulting shorts would lead to increased levels of spatter. However, because the welding programs were hot, shorts were relatively infrequent. Conventional wisdom suggested that any shorts were the result of a poorly designed or executed welding program, and therefore there was little effort to improve the performance of clearing of shorts in a pulsed GMAW program.

Shorts can occur in any of the states described with respect to FIGS. 2A and 2B, but shorts commonly occur in the background state 103 (as shown in FIG. 2B), and occur rarely and/or inconsistently in the peak-to-background transitional state 106. When a short does occur, the wire electrode needs to be reignited. One way to reignite the wire electrode is by adjusting the advancement of the wire, for example, by slowing, stopping or retracting the wire. Adjustment of the wire electrode, however, is often difficult and cost prohibitive. Another way to reignite the wire is to increase the welding current level. Conventionally, increasing the current level during the short has been via a current controlled program, for example with a fixed current ramp rate, similar to the control in the background-to-peak transitional state 102 or peak-to-background transitional state 106.

As shown in the current waveform of FIG. 2B, during the background portion 103, a short occurs at 113, which is determined when the arc voltage suddenly and rapidly decreases (represented as 111 in the voltage waveform). In response to the change in the voltage, the controller then identifies entry into a short state. In the short state the controller transitions to voltage-control (from a current-control) and uses a short state target voltage as a command. The controller then increases the current 109, which therefore causes the output voltage to increase 107, as the controller attempts to make the voltage match the commanded short state target voltage. As the output current and voltage both increase, the short clears, which is determined when the arc voltage suddenly and rapidly rises represented at 112. As shown in the current waveform, as the short clears at 114, the current level is greater than the background current $I_{BG}$, but less than the peak current $I_{PEAK}$.

Thereafter, the controller transitions from the short state. The controller remains voltage-controlled and uses a background voltage 115 as a command voltage (target). The controller then decreases the current 110, which therefore causes the voltage to decrease 108, as the control attempts to make the output voltage match the background voltage command. After the output voltage reaches the background voltage 115, the controller will return to current-controlled, or may remain voltage-controlled. In some examples, the short state target voltage is greater than the command voltage (e.g., background voltage 115). In some examples, the short state target voltage is less than the command voltage.

Therefore, the process disclosed herein provides for fine control of the welding power output, based on a voltage-controlled process responsive to a changing current output, providing a quick and effective way to clear a short. The disclosed examples achieve this end without requiring additional control of the welding wire movement and/or sharp and/or unregulated increases in current output. For example, welding process, material type, temperature, desired voltage, power or current output can be used to calculate when the controller transitions, for how long, at what particular value, threshold or rate, among others.

Figure 3:
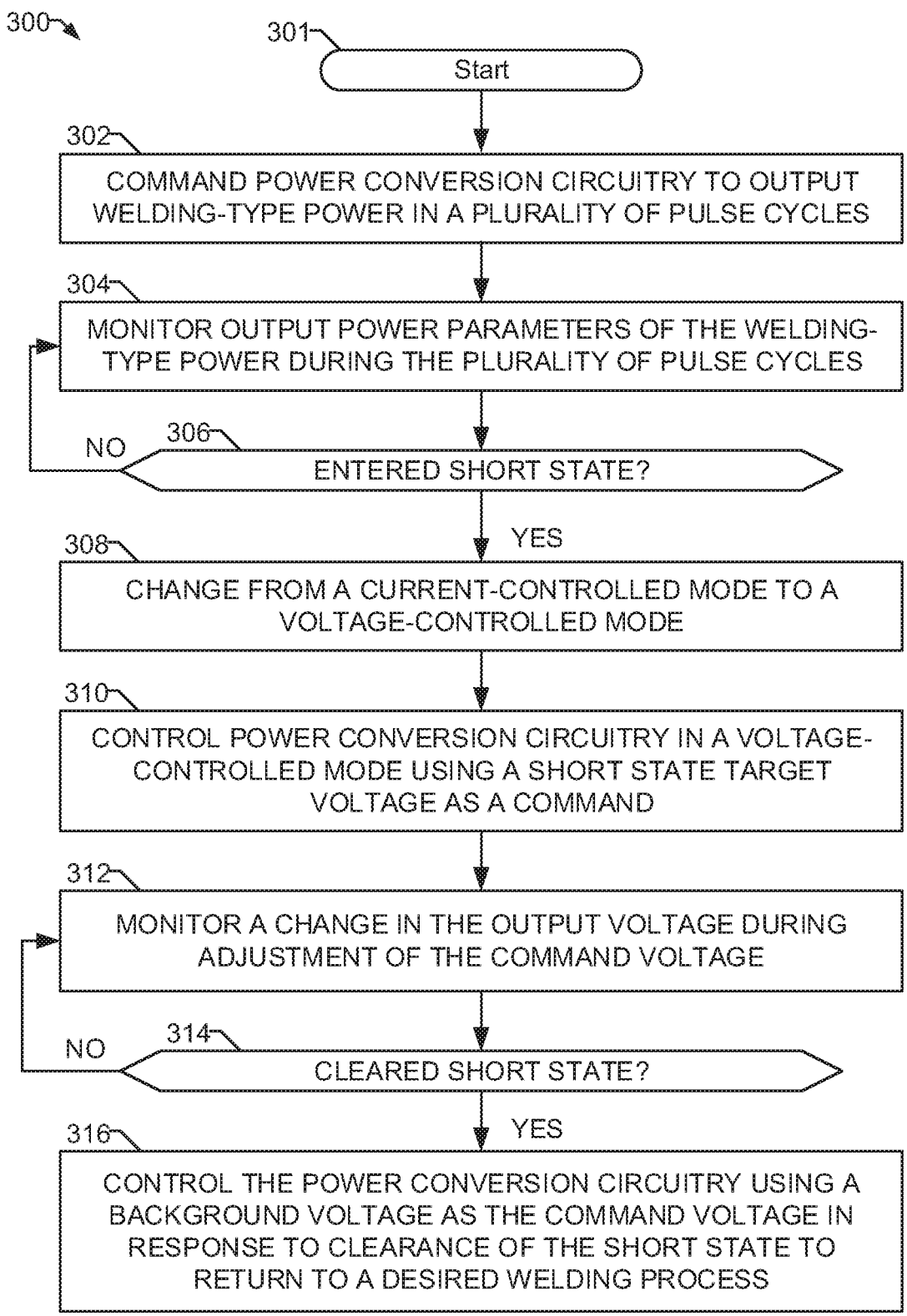
FIG. 3 is a flowchart representative of example machine readable instructions which may be executed to implement the welding-type power supply of FIG. 1 to control pulse welding in accordance with aspects of this disclosure.

FIG. 3 is a flowchart illustrating example method 300 of operating a welding-type system, for example, the welding-type system 10 of FIG. 1 to implement the waveforms of FIGS. 2A and 2B. The method 300 of FIG. 3 may be implemented by a controller (e.g., control circuitry 22) by executing machine-readable instructions, such as stored on a non-transitory machine-readable storage device (e.g., removable memory 28).

Figure 4:
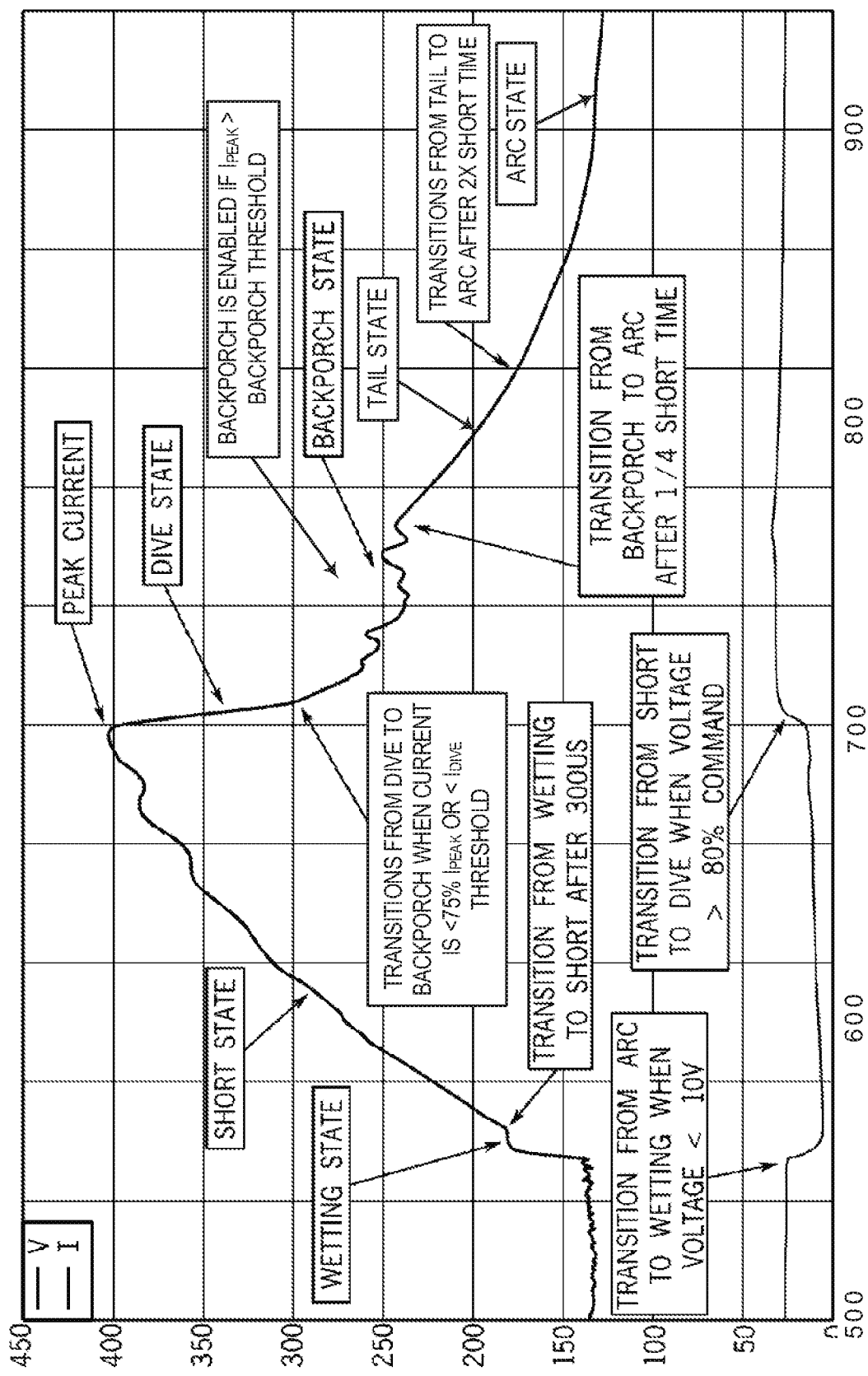
FIG. 4 shows current and voltage waveforms and associated states and transitions for an example short circuit transfer in accordance with aspects of this disclosure.

The method 300 starts at block 301. At block 302, the controller commands power conversion circuitry (e.g., power conversion circuitry 20) to convert input power to output welding-type power in a plurality of pulse cycles, each pulse cycle comprising a background portion, a ramp up portion, a peak portion, and a ramp down portion (e.g., as shown in FIGS. 2A, 2B and 4).

At block 304 the controller monitors one or more output power parameters of the welding-type power during the plurality of pulse cycles (e.g., monitoring system outputs, via sensors 49, etc.). At block 306, the controller determines whether a short state has been entered based on the one or more output power parameters (e.g., a spike in voltage; see FIG. 2B). If no short state exists, the method returns to block 304 and continues monitoring the one or more output parameters.

If the process has entered a short state, in block 308 the controller changes from a current-controlled mode to a voltage-controlled mode in response. In block 310, the controller controls the power conversion circuitry in a voltage-controlled mode using a short state voltage as a command voltage in response to the short state.

In block 312, the controller monitors a change in the output voltage during adjustment of the command voltage. In block 314, the controller determines when the short state has cleared based on a rate of change in the output voltage. If the short state has not cleared, the method returns to block 312 and continues to monitor the output voltage.

If the short state has cleared, in block 316 the controller controls the power conversion circuitry using a background voltage as the command voltage in response to clearance of the short state to return to a desired welding process.

FIG. 4 shows the current and voltage waveforms associated with varying states and transitions for the improved example pulsed welding cycle, during a short circuit transfer (i.e. a short state). Generally, the pulsed welding cycle is described as a short, followed by an arc, and then repeating. Because the process is cyclical, it could be described as starting anywhere in the cycle, and then repeating when the process returns to that point. When there is a CV output, the process naturally alternates between arc and short, as described above. Using the waveform of FIG. 3 and/or the control scheme described below, results in a CV short circuit output with less spatter.

The cycle start in FIG. 4 is at the wetting state where the short is formed (see, e.g., FIG. 2B). The output current is increased until the short clears. During the time the output is in the short state a determined park short current for each cycle is found using a voltage feedback, current feedback or using the commanded target voltage (e.g., short state voltage) and/or peak current. Determined peak current refers to the actual peak current (the current value at clearance of the short) or a commanded peak current. Also, the time that the process is in the short state is recorded. Short clearing is detected by a change in output voltage. When the output voltage experiences a rapid increase, the short has cleared.

When the short clears, the current is commanded to decrease rapidly, described as a dive rate and characterized as a dive state. The dive rate may be 2, 3, 4 or 8 times the normal rate of adjustment, but can be more than 8 times as desired. The dive rate continues until a trigger event occurs, or other measured or calculated value is achieved. In some examples, the trigger corresponds to the current value falling to a predetermined threshold value, and/or a determined time passes, and/or a number of amp-seconds has been provided. The threshold value can be a function of the actual and/or commanded peak short current, such as a percentage of the peak short current of the short that just ended (which is in that cycle given when the cycle started). In some examples, the percentage is about 75%, or 70-80%, or at least 75%. Thus, when the current decreases to or below the threshold value (for example to below 75% of the peak short current), the dive rate ends.

When the dive rate ends, the current is reduced at a rate of change less than the dive rate. One alternative provides for allowing the current to remain at a steady rate before the current is reduced at the rate of change less than the dive rate. For example, the steady rate can be provided for a period of time equal to a second percentage of the time the output is in the short state for the given cycle. Other alternatives provide for a slight decrease (which is a lesser rate than the normal rate). This is called the post dive state and is maintained for a time that is a percentage of the time the current was in the short state in that cycle. In some examples, the post dive state (also called the porch) is maintained for about 25% of the time spent in the just ended short state (in that cycle, given when the cycle started). Alternatives include spending 20-30% of the short time in the post dive state, or spending at least 25% of the short time in the post dive state. Another alternative provides that post dive rate is such that the current for the rest of the arc state is sufficient to melt the wire to the desired amount.

After the post dive state ends, the current decreases at the normal rate until a short forms, and then the cycle repeats. In some examples, the current waveform transitions from the post dive state to a tail state, which is a transitional state between post dive state and the arc state. For example, the waveform is in the tail state after a time greater than the time the current was in the short state (e.g., approximately double the amount of time in the short state).

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application-specific integrated circuit or chip. Some implementations may comprise a non-transitory machine-readable (e.g., computer-readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
power conversion circuitry configured to convert input power to welding-type power; and
control circuitry configured to control the power conversion circuitry to output the welding-type power in a plurality of pulse cycles, each pulse cycle comprising a background portion, a ramp up portion, a peak portion, and a ramp down portion, wherein the controlling the power conversion circuitry comprises:
- controlling the power conversion circuitry in a current-controlled mode in the ramp up portion and the ramp down portion;
- monitoring one or more output power parameters of the welding-type power during the plurality of pulse cycles;
- determining a short state has been entered based on the one or more output power parameters;
- when the pulse cycle is in the ramp up portion or the ramp down portion, changing from the current-controlled mode to a voltage-controlled mode in response to entering the short state; and
- controlling the power conversion circuitry in the voltage-controlled mode during the short state using a short state target voltage as a command voltage in response to the short state having been entered.

2. The welding-type system as defined in claim 1, wherein the one or more output parameters comprises a voltage, a current, or a time value, the control circuitry configured to:
- monitor a change in output voltage during adjustment of the command voltage;
- determine when the short state has cleared based on a rate of change in the output voltage; and
- control the power conversion circuitry using a background voltage as the command voltage in response to clearance of the short state.

3. The welding-type system as defined in claim 1, wherein the control circuitry is configured to control the power conversion circuitry in the current-controlled mode in response to clearance of the short state.

4. The welding-type system as defined in claim 3, wherein the one or more output parameters comprises a voltage, a current, or a time value, the control circuitry configured to:
- control the power conversion circuitry to decrease the current at a first rate following clearance of the short state until a trigger event occurs; and
- control the power conversion circuitry to decrease the current at a second rate in response to the occurrence of the trigger.

5. The welding-type system as defined in claim 4, wherein the trigger corresponds to a threshold current value, the control circuitry configured to:
- monitor the current during the ramp down portion;
- determine the trigger has occurred when the current reaches a threshold current value; and
- control the power conversion circuitry to decrease the current at the second rate in response to reaching the threshold current value.

6. The welding-type system as defined in claim 5, wherein the threshold current value corresponds to a back porch current value, the control circuitry configured to control the power conversion circuitry to transition to a back porch state when the current reaches the back porch current value.

7. The welding-type system as defined in claim 6, wherein the control circuitry is configured to calculate the back porch current value as a predetermined percentage of the peak current.

8. The welding-type system as defined in claim 6, wherein the predetermined percentage is 75% of the peak current.

9. The welding-type system as defined in claim 5, wherein the control circuitry is configured to control the power conversion circuitry to decrease the current at the second rate until a background current is reached.

10. The welding-type system as defined in claim 4, wherein the trigger corresponds to a predetermined amount of time, the control circuitry configured to control the power conversion circuitry to decrease the current at the second rate for the predetermined amount of time.

11. The welding-type system as defined in claim 4, wherein the ramp down portion comprises a dive state and a post dive state.

12. The welding-type system as defined in claim 11, wherein the first rate corresponds to the dive state.

13. The welding-type system as defined in claim 11, wherein the second rate corresponds to the post dive state.

14. The welding-type system as defined in claim 1, wherein the control circuitry is configured to control the power conversion circuitry in the voltage-controlled mode by controlling the power conversion circuitry based on comparing an output voltage of the power conversion circuitry to the command voltage.

15. The welding-type power supply as defined in claim 1, wherein the control circuitry is configured to derive the change in the current from an inductor parameter based on the following equation:

$$L = \frac{V}{d_i} d_t,$$

where L is the inductance parameter, V is a difference between the commanded output voltage and a representative output voltage value for one or more short circuit clearing events, $d_t$ is a representative control loop period, and $d_i$ is a representative current change for the control loop period.

16. A method for pulse welding, the method comprising:
- controlling, via control circuitry, power conversion circuitry to convert input power to output welding-type power in a plurality of pulse cycles, each pulse cycle comprising a background portion, a ramp up portion, a peak portion, and a ramp down portion, wherein the controlling the power conversion circuitry comprises:
  - controlling the power conversion circuitry in a current-controlled mode in the ramp up portion and the ramp down portion;
  - monitoring one or more output power parameters of the welding-type power during the plurality of pulse cycles;
  - determining a short state has been entered based on the one or more output power parameters;
  - when the pulse cycle is in the ramp up portion or the ramp down portion, changing from the current-controlled mode to a voltage-controlled mode in response to entering the short state;
  - controlling the power conversion circuitry in a voltage-controlled mode during the short state using a short state target voltage as a command voltage in response to the short state having been entered.

17. The method as defined in claim 16, further comprising:
- monitoring a change in the output voltage during adjustment of the command voltage;
- determining when the short state has cleared based on a rate of change in the output voltage; and
- controlling the power conversion circuitry using a background voltage as the command voltage in response to clearance of the short state.

18. The method as defined in claim 16, wherein the one or more output parameters comprises a voltage, a current, or a time value, the method further comprising:
   controlling the power conversion circuitry to decrease the current at a first rate following clearance of the short state until a trigger occurs; and
   controlling the power conversion circuitry to decrease the current at a second rate in response to the occurrence of the trigger.

19. The method as defined in claim 18, wherein the trigger corresponds to a threshold current value, the method further comprising:
   monitoring the current during the ramp down portion;
   determining the trigger has occurred when the current reaches a threshold current value; and
   controlling the power conversion circuitry to decrease the current at the second rate in response to reaching the threshold current value.

20. The welding-type system of claim 1, wherein the controlling the power conversion circuitry further comprises, after controlling the power conversion circuitry in the voltage-controlled mode during the short state, remaining in the voltage-controlled mode during a subsequent pulse cycle of the plurality of pulse cycles.

21. The welding-type system of claim 1, wherein the controlling the power conversion circuitry further comprises using a background voltage as the command voltage through the background portion of the pulse cycle.

\* \* \* \* \*